United States Patent [19]

Okaji et al.

[11] Patent Number: 5,378,568
[45] Date of Patent: Jan. 3, 1995

[54] ELECTROPHOTOGRAPHIC PHOTORECEPTOR CONTAINING AN AZO PIGMENT

[75] Inventors: Makoto Okaji; Akira Itoh, both of Tokyo, Japan

[73] Assignee: Mitsubishi Paper Mills Limited, Tokyo, Japan

[21] Appl. No.: 84,987

[22] Filed: Jul. 2, 1993

[30] Foreign Application Priority Data

Jul. 6, 1992 [JP] Japan .................... 4-178553

[51] Int. Cl.$^6$ ............................. G03G 5/06
[52] U.S. Cl. .......................... 430/58; 430/76
[58] Field of Search ............... 430/58, 76, 56

[56] References Cited

U.S. PATENT DOCUMENTS 4,999,269 3/1991 Emoto et al. .
5,041,349 8/1991 Emoto et al. .

FOREIGN PATENT DOCUMENTS 3-179358 8/1991 Japan ..................... 430/76
3-274571 12/1991 Japan ..................... 430/76

*Primary Examiner*—Christopher D. Rodee
*Attorney, Agent, or Firm*—Cushman, Darby & Cushman

[57] ABSTRACT

The present invention provides an electrophotographic photoreceptor which comprises an electrically conductive support and a light-sensitive layer which contains an azo pigment represented by the following formula (I):

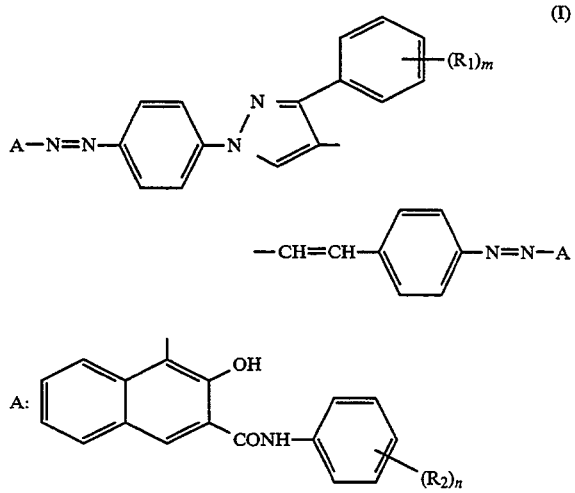

wherein $R_1$ represents an unsubstituted or substituted alkyl or alkoxy group having 3 to 8 carbon atoms, $R_2$ represents a hydrogen atom, a halogen atom or an unsubstituted or substituted alkyl or alkoxy group having 1 to 3 carbon atoms and m and n each represent 1 or 2.

9 Claims, No Drawings

ELECTROPHOTOGRAPHIC PHOTORECEPTOR CONTAINING AN AZO PIGMENT

BACKGROUND OF THE INVENTION

The present invention relates to an electrophotographic photoreceptor, particularly to a novel electrophotographic photoreceptor having a light-sensitive layer containing an azo pigment and more particularly to an electrophotographic photoreceptor high in sensitivity and excellent in endurance against repeated use.

Hitherto, as electrophotographic photoreceptors, there have been widely known those which have a light-sensitive layer mainly composed of inorganic photoconductors such as selenium, cadmium sulfide, zinc oxide and silicon. However, these inorganic photoconductors are not necessarily satisfactory in sensitivity, heat stability, moisture resistance and endurance, and especially, selenium and cadmium sulfide suffer from the restriction in production and handling owing to their toxicity.

On the other hand, electrophotogrpahic photoreceptors having a light-sensitive layer mainly composed of organic photoconductive compounds have many advantages, namely, they are relatively easy in production, low in price, easy in handling and superior in heat stability to the selenium photoreceptors and they have recently been noticed.

As the organic photoconductive compounds, poly-N-vinylcarbazole is well known and an electrophotographic photoreceptor having a light-sensitive layer mainly composed of a charge transfer complex formed from the poly-N-vinylcarbazole and a Lewis acid such as 2,4,7-trinitro-9-fluorenone is disclosed in Japanese Patent Kokoku No. 50-10496. However, this photoreceptor is not necessarily satisfactory in sensitivity, film-formability and endurance.

On the other hand, function-separated photoreceptors of double-layered or dispersed type in which the carrier generation function and the carrier transport function are allotted to separate materials, respectively, have the merits that materials for the respective functions can be selected from a wide variety of materials and photoreceptors having optional characteristics such as chargeability, sensitivity and endurance can be relatively easily produced.

Hitherto, various materials have been proposed as the carrier generation materials and the carrier transport materials. For example, electrophotographic photoreceptors having a light-sensitive layer composed of combination of a carrier generation layer comprising amorphous selenium and a carrier transport layer mainly composed of poly-N-vinylcarbazole have been put to practical use. However, the carrier generation layer comprising amorphous selenium is inferior in endurance.

Furthermore, use of organic dyes or pigments as carrier generation materials has been proposed and, for example, electrophotographic photoreceptors containing monoazo pigments and bisazo pigments in the light-sensitive layer are proposed in Japanese Patent Kokoku Nos. 48-30513 and 56-11945 and Japanese Patent Kokai Nos. 52-4241 and 54-46558.

There have been proposed various electrophotographic photoreceptors containing low molecular weight organic photoconductors comprising combination of the above carrier generation materials with the carrier transport materials represented by triphenylamines, stilbenes and hydrazones and use of photoreceptors mainly composed of such organic photoconductive compounds is becoming widespread in the fields of electrostatic copying machines and photo printers.

However, for these copying machines and printers are required more and more higher speed output as well as higher function and the conventional photoreceptors do not have photo-sensitivity and photo-responsivity which satisfy these requirements. Moreover, when an organic photoreceptor is subjected to the complicated process which comprises charging, exposing and discharging in the copying machine, etc., the compounds constituting the photoreceptor not only perform the generation and transportation of carriers, but also receive stimuli such as ozone and light in a high electric field. Therefore, as the process is repeated, there occur various problems such as decrease of initial potential after charging and increase of residual potential after discharging.

SUMMARY OF THE INVENTION

The object of the present invention is to provide an electrophotographic photoreceptor which has high sensitivity and shows a little change in the initial potential and the residual potential even after repeatedly used in the electrophotographic processor and which is applicable to high-speed machines.

As a result of intensive research on electrophotographic photoreceptors applicable to high-speed type copying machines, it has been found that an electrophotographic photoreceptor which contains in its light-sensitive layer at least one azo pigment represented by the following formula (I) has high sensitivity and excellent endurance against repeated use without necessity to greatly change the process conditions of high-speed type machines:

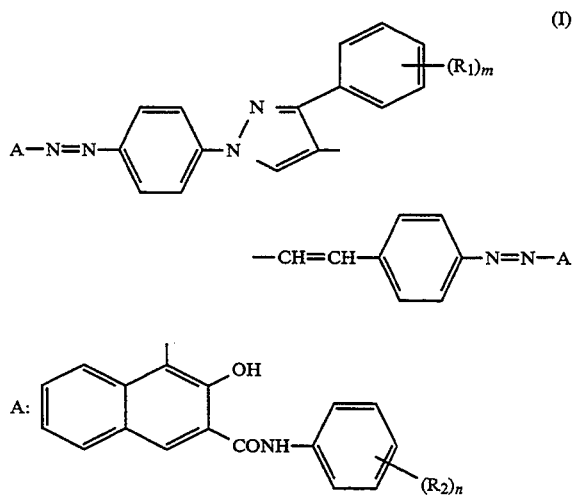

(wherein $R_1$ represents a substituted or unsubstituted alkyl or alkoxy group of 3 to 8 carbon atoms, $R_2$ represents a hydrogen atom, a halogen atom or a substituted or unsubstituted alkyl or alkoxy group of 1 to 3 carbon atoms and m and n each represent 1 or 2). Thus, present invention has been accomplished.

Although the azo pigments represented by the above formula (I) are included in the compounds disclosed in U.S. Pat. Nos. 4,999,269 and 5,041,349 which are of the present inventors, it has been found that only the compounds represented by only the formula (I), namely, only the compounds in which A includes an alkyl or alkoxy group having a specific carbon number among the compounds disclosed in the above U.S. patents are unexpectedly peculiarly applicable to high-speed processing machines. Thus, the present invention has been accomplished.

That is, it has become clear that the electrophotographic photoreceptors containing the azo pigments disclosed in the above U.S. patents can be applied to only the low-speed processing machines of at most about 20 copies/min while the electrophotographic photoreceptors containing the pigments of the present invention can be applied to high-speed processing machines of as high as 40–50 copies/min.

The present invention is an electrophotographic photoreceptor characterized by having a light-sensitive layer containing the azo pigment represented by the formula (I) on an electrically conductive support.

That is, according to the present invention, an electrophotographic photoreceptor which is excellent in sensitivity, charge retention and residual potential and is less in deterioration due to fatigue when repeatedly used and in addition can exhibit stable characteristics with showing no change of the above-mentioned characteristics against heat or light can be provided by using the azo pigment represented by the formula (I) as the photoconductive material which constitutes the electrophotographic photoreceptors and furthermore, by using the azo pigment as a carrier generation material of function-separated type electrophotographic photoreceptors by utilizing only the excellent carrier generating function of the azo pigment.

DESCRIPTION OF THE INVENTION $R_1$ in the formula (I) includes alkyl and alkoxy groups of 3 to 8 carbon atoms such as propyl groups, isopropyl group, butyl group, isobutyl group, tert-butyl group, pentyl group, isopentyl group, hexyl group, octyl group, propoxy group, isopropoxy group, butoxy group and pentyloxy group. These may have a substituent. $R_2$ includes hydrogen atom, halogen atoms such as chlorine atom and bromine atom and alkyl and alkoxy groups of 1 to 3 carbon atoms such as methyl group, ethyl group, propyl group, methoxy group, ethoxy group and trifluoromethyl group. These groups may have a substituent.

Examples of the azo pigments of the present invention are shown in the following Tables 1 and 2.

TABLE 1

| Azo pigments | $R_1$ | $R_2$ |
| --- | --- | --- |
| P1 | 2-$(CH_2)_2CH_3$ | 4-Cl |
| P2 | 2-$(CH_2)_3CH_3$ | 4-Cl |
| P3 | 4-$(CH_2)_4CH_3$ | 4-Cl |
| P4 | 3-$(CH_2)_5CH_3$ | 4-Cl |
| P5 | 4-$(CH_2)_6CH_3$ | 4-Cl |
| P6 | 3-$(CH_2)_7CH_3$ | 4-Cl |
| P7 | 4-$O(CH_2)_5CH_3$ | H |
| P8 | 2-$OCH_2CH_2CH_3$ | 2-Br, 4-$CH_3$ |
| P9 | 3-$OCH_2CH(CH_3)_2$ | 4-$CH_3$ |
| P10 | 4-$(CH_2)_2CH_3$ | 2-$CH_3$ |

TABLE 2

| Azo pigments | $R_1$ | $R_2$ |
| --- | --- | --- |
| P11 | 4-$OCH(CH_3)_2$ | 4-$OC_2H_5$ |
| P12 | 2-$(CH_2)_2CH_3$ | 2,5-$(Cl)_2$ |
| P13 | 4-$CH(CH_3)_2$ | 4-Cl |
| P14 | 4-$C(CH_3)_3$ | 4-Cl |

TABLE 2-continued

| Azo pigments | $R_1$ | $R_2$ |
| --- | --- | --- |
| P15 | 4-$O(CH_2)_6CH_3$ | 3,5-$(CF_3)_2$ |
| P16 | 2-$(CH_2)_2CH_3$ | 3-$CF_3$ |
| P17 | 4-$CH_2CH(CH_3)$ | 2-Br |
| P18 | 3,5-$((CH_2)_2CH_3)_2$ | 2-$CH_3$ |
| P19 | 2,4-$(O(CH_2)_3CH_3)_2$ | 2-Br |
| P20 | 4-$(CH_2)_2CH_3$ | 4-$O(CH_2)_2CH_3$ |

The disazo compound represented by the formula (I) can be readily prepared by azotizing an amino compound represented by the following formula by known process and then coupling the product with a corresponding coupler in the presence of an alkali or by once isolating a diazonium salt of said amino compound in the form of borofluoride salt or zinc chloride double salt and then coupling the salt with the coupler in a suitable solvent (e.g., N,N-dimethylformamide, dimethylsulfoxide, ethanol and dioxane) in the presence of an organic or inorganic alkali.

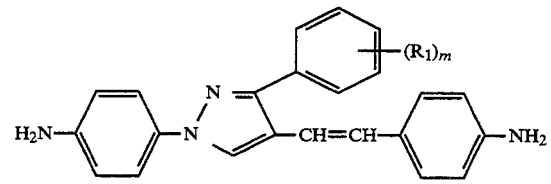

In the above formula, $R_1$ and m are as defined in the formula (I).

The electrophotographic photoreceptor of the present invention has a light-sensitive layer containing at least one azo pigment represented by the formula (I). Light-sensitive layers of various types shown in the following (1)–(4) are known and the light-sensitive layer of the present invention may be any of these known layers.

(1) Light-sensitive layer comprising azo pigment.

(2) Light-sensitive layer comprising a binder in which the azo pigment is dispersed.

(3) Light-sensitive layer comprising a carrier transport material in which the azo pigment is dispersed.

(4) Light-sensitive layer comprising double layers of either one of said layers (1)–(3) as a carrier generation layer and a carrier transport layer containing a carrier transport material.

The azo pigment represented by the formula (I) generates a charge carrier in a very high efficiency upon absorption of light. The generated carriers can be transported through the azo pigment as a medium, but preferably they are transported through a known carrier transport material as a medium. For this reason, the light-sensitive layers of types (3) and (4), namely, the function-separated type light-sensitive layers are especially preferred.

The carrier transport materials can generally be classified to two kinds, the electron transport material and the hole transport material. As the hole transport materials, the electron donative organic photoconductive compounds can be used and examples are oxadiazoles shown in Japanese Patent Kokoku No. 34-5466, triphenylmethanes shown in Japanese Patent Kokoku No. 45-555, pyrazolines shown in Japanese Patent Kokoku No. 52-4188, hydrazones shown in Japanese Patent Kokoku No. 55-42380, oxadiazoles shown in Japanese Patent Kokai No. 56-123544, triarylamines shown in Japanese Patent Kokoku No. 58-32372 and stilbenes shown in Japanese Patent Kokai No. 58-198043.

On the other hand, the electron transport materials are electron attracting compounds having an attracting group such as nitro group, cyano group, ester group or the like and include, for example, chloranil, tetracyanoethylene, 2,4,7-trinitro-9-fluorenone, 2,4,5,7-tetranitroxanthone and 1,3,7-trinitrodibenzothiophene.

Furthermore, there may also be used high molecular compounds such as poly-N-vinylcarbazole, halogenated poly-N-vinylcarbazole, polyvinylpyrene, polyvinylanthracene, polyvinylacridine, polyglycidylcarbazole, polyvinylacenaphthene, ethylcarbazoleformaldehyde resin, etc.

The carrier transport materials can be used each alone or in combination of two or more and are not limited to those mentioned here. However, among these carrier transport materials, hydrazone compounds, stilbene compounds and triarylamine compounds are especially preferred because they have a high carrier (hole) transportability and provide excellent photoreceptors. For example, as for the hydrazone compounds there may be used those which are described in the above Japanese Patent Kokoku No. 55-42380 and furthermore, in Japanese Patent Kokai Nos. 1-100555, 2-10367, 2-51163, 2-96767, 2-183260, 2-184856, 2-184858, 2-184859 and 2-226160.

The electrophotographic photoreceptors of the present invention can be made in accordance with the conventional method. For example, electrophotographic photoreceptors having the light-sensitive layer of type (1) mentioned above can be made by coating on an electrically conductive support a coating solution obtained by dissolving or dispersing an azo pigment represented by the formula (I) in an appropriate medium and drying to form a light-sensitive layer of generally 0.1 to several tens μm thick.

As the media used for preparation of the coating solution, mention may be made of basic solvents which dissolve azo pigments such as n-butylamine and ethylenediamine and media which disperse azo pigments such as ethers, e.g., tetrahydrofuran and 1,4-dioxane; ketones, e.g., methyl ethyl ketone and cyclohexanone; aromatic hydrocarbons, e.g., toluene and xylene; nonprotonic polar solvents, e.g., N,N-dimethylformamide, acetonitrile, N-methylpyrrolidone and dimethylsulfoxide; alcohols, e.g., methanol, ethanol and isopropanol; esters, e.g., ethyl acetate, methyl acetate and methyl cellosolve acetate; and chlorinated hydrocarbons, e.g., dichloromethane, dichloroethane and chloroform.

When a medium which disperses azo pigment is used, the azo pigment must be made to fine particles of 5 μm or less, preferably 3 μm or less in particle size.

As the electrically conductive supports on which a light-sensitive layer is formed, there may be used any of those which are employed for conventional electrophotographic photoreceptors. Specifically, there may be used drums, sheets or belts of gold, silver, platinum, titanium, aluminum, copper, zinc, iron, metallic oxides subjected to electrical conduction treatment, or laminates of foils of these metals or metal oxides or metallized sheets thereof.

Further examples are drums, sheets and belts made of plastics, ceramics or papers which are coated with electrically conductive substances such as metallic powder, metallic oxide, carbon black, carbon fiber, copper iodide, charge transfer complex, inorganic salt and ion-conductive polymer electrolyte together with suitable binders and are subjected to electric conduction treatment. In addition, there may be exemplified drums, sheets and belts made of plastics, ceramics or papers rendered electrically conductive by containing the electrically conductive substances mentioned above.

Electrophotographic photoreceptors having a light-sensitive layer of the aforementioned type (2) can be produced by dissolving a binder in the coating solution as used for forming the light-sensitive layer of type (1). In this case, the medium for the coating solution is preferably one which dissolves the binder.

The binder resins include, for example, polymers or copolymers of vinyl compounds such as styrene, vinyl acetate, acrylic esters and methacrylic esters and thermosetting resins or photosetting resins such as silicone resin, phenoxy resin, poly-vinyl-butyral resin, poly-vinyl-formal resin, phenolic resin, polycarbonate resin, polyarylate resin, polyamide resin, polyimide resin, epoxy resin and urethane resin. The binder is used in an amount of 0.1 to 5 parts by weight per one part by weight of the azo pigment. It is preferred for forming the light-sensitive layer of this type to allow the azo pigment in the form of fine particles, for example, 3 μm or less in particle size to be present in the binder.

Electrophotographic photoreceptors having a light-sensitive layer of the type (3) can be produced by dissolving a carrier transport material in the coating solution used for formation of the light-sensitive layer of the type (1). As the carrier transport materials, there may be used any of those which are exemplified hereinbefore. Apart from the high molecular weight carrier transport materials which per se can be used as a binder such as polyvinylcarbazole and polyglycidylcarbazole, low molecular weight carrier transport materials are preferably used with a binder. As the binders, of those which are exemplified hereinbefore may be used.

In this case, amount of the binder used is normally 0.5 to 100 parts by weight per one part by weight of the azo pigment. Amount of the carrier transport material is 0.2 to 3.0, preferably 0.3 to 1.2 part by weight per one part by weight of the binder. Amount of the carrier transport material which per se can be used as a binder is normally 1 to 10 parts by weight per one part by weight of the azo pigment. The azo pigment is preferably present in the form of fine particles in the high molecular carrier transport material or binder.

Electrophotographic photoreceptors having a light-sensitive layer of the type (4) can be produced by coating a coating solution prepared by dissolving a carrier transport material in a suitable medium on the light-sensitive layer of the type (1), (2) or (3) and drying the coat to form a carrier transport layer on the light-sensitive layer. In this case, the light-sensitive layers of the types (1) to (3) play a role of a carrier generation layer and thickness thereof is preferably 0.1 to 20 μm. The carrier transport layer is not necessarily be provided on the carrier generation layer and may be provided between the carrier generation layer and the electrically conductive support. However, from the point of endurance it is preferably provided on the carrier generation layer.

The carrier transport layer may be formed in the same manner as the formation of the light-sensitive layer of the type (3). That is, there may be used the coating solution used for formation of the light-sensitive layer of the type (3) from which the azo pigment has been omitted. Generally, the carrier transport layer has a thickness of 5 to 50 microns.

The electrophotographic photoreceptor of the present invention may further contain antioxidants such as 2,6-di-tert-butyl-p-cresol and DL-α-tocopherol to inhibit deterioration of the constituting organic compounds due to oxidation. Furthermore, the electrophotographic photoreceptor may contain known sensitizers. Suitable sensitizers include dyes and Lewis acids which form a charge transfer complex with an organic photoconductive substance.

As examples of the Lewis acids, mention may be made of electron attracting compounds, e.g., quinones such as chloranil, 2,3-dichloro-1,4-naphthoquinone, 2-methylanthraquinone, 1-nitroanthraquinone, 1-chloro-5-nitroanthraquinone, 2-chloroanthraquinone and phenanthrenequinone; aldehydes such as 4-nitrobenzaldehyde; ketones such as 9-benzoylanthracene, indandione, 3,5-dinitrobenzophenone and 3,3',5,5'-tetranitrobenzophenone; acid anhydrides such as phthalic anhydride and 4-chloronaphthalic anhydride; cyano compounds such as tetracyanoethylene, terephthalmalonitrile and 4-nitrobenzalmalonitrile and phthalides such as 3-benzalphthalide, 3-(α-cyano-p-nitrobenzal)phthalide and 3-(α-cyano-p-chlorobenzal)phthalide.

As examples of the dyes, mention may be made of triphenylmethane dyes such as Methyl Violet, Brilliant Green and Crystal Violet, thiazine dyes such as Methylene Blue, quinone dyes such as quinizarin, cyanin dyes, pyrylium salts, thiapyrylium salts and benzopyrylium salts.

Furthermore, the light-sensitive layer of the electrophotographic photoreceptors of the present invention may contain inorganic photoconductive fine particles such as selenium and selenium-arsenic alloy and organic photoconductive pigments such as copper-phthalocyanine pigment and perylene pigment. In addition, the light-sensitive layer may contain known plasticizers to improve film forming property, flexibility and mechanical strength. As the plasticizers, mention may be made of phthalic esters, phosphoric esters, epoxy compounds, chlorinated paraffins, chlorinated fatty acid esters and aromatic compounds such as alkylated naphthalenes.

If necessary, there may be further provided a blocking layer between the light-sensitive layer and the electrically conductive support in order to control the injection of charge into the support from the light-sensitive layer and besides, there may be provided a surface protective layer on the surface of the light-sensitive layer for improving endurance of the photoreceptor.

The present invention is explained in more detail by the following examples, but they should not be construed as limiting the invention in any manner.

EXAMPLE 1

One part by weight of bisazo pigment P3 exemplified hereinbefore and 1 part by weight of a phenoxy resin (PKHJ manufactured by Union Carbide Corporation) were mixed with 100 parts by weight of dimethoxyethane and dispersed for 2 hours by a paint conditioner together with glass beads. The resulting pigment dispersion was coated on an aluminum-vapor deposited film (METALMY manufactured by Toray Industries, Inc.) by an applicator and dried at 80° C. for 15 minutes to form a carrier generation layer having a thickness of about 0.2μ.

On the carrier generation layer formed above was coated a solution prepared by dissolving 10 parts by weight of the hydrazone compound represented by the following formula and 10 parts by weight of a polyarylate resin (U-polymer manufactured by Unitika Ltd.) in 200 parts by weight of dichloromethane by an applicator and dried at 80° C. for 60 minutes to form a carrier transport layer having a dry thickness of 20μ.

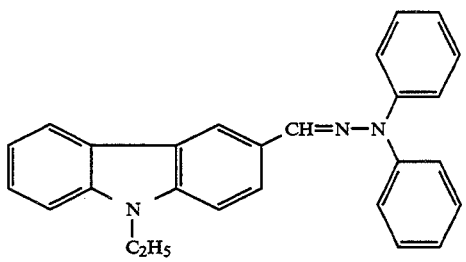

The resulting double-layered type electrophotographic photoreceptor was stored in the dark at room temperature for 24 hours and thereafter, electrophotographic characteristics of the photoreceptor was evaluated by an electrostatic recording tester (SP-428 manufactured by Kawaguchi Electric Mfg. Co., Ltd.). The measuring conditions were corona applied voltage: −6 kV, static mode No. 3 (namely, processing speed 167 mm/sec) and illuminance of irradiated light (white light): 2 lux. Results of the evaluation were as follows. Charged voltage: −705 V and half decay exposure: 1.0 lux·sec. These values mean that the photoreceptor had high sensitivity.

Then, the photoreceptor was stuck on an aluminum hollow drum and characteristics of repetition of charging and exposing of the photoreceptor were evaluated by a drum photoreceptor evaluation apparatus (CYNTHIA 90 manufactured by Jentech Co.). The measurement was conducted by repeating the cycle of charging and discharging by exposing to light 5000 times at corona applied voltage: −6.5 kV, processing speed 160 mm/sec and TCCD2 mode. The discharging by exposing to light was carried out using a tungsten lamp array. Surface potential after charging, namely, charged potential and surface potential after discharging by exposure to light, namely, residual potential were measured and the results are shown in Table 3. It can be seen that changes in the charged potential and the residual potential are a little.

EXAMPLES 2-6 AND COMPARATIVE EXAMPLES 1-3

Table 4 shows examples of azo pigments represented by the formula (1) where R1 has two or less carbon atoms as comparative azo pigments. Double-layered type photoreceptors were produced in the same manner as in Example 1 except that the azo pigments as shown in Tables 4 and 5 were used. The half decay exposure and the repetition characteristics of the resulting photoreceptors were measured under the same conditions as in Example 1. The results are shown in Table 3.

TABLE 3

| | Half decay exposure (lux·sec) | The first measurement (V) | | The 5000th measurement (V) | |
|---|---|---|---|---|---|
| | | Charged potential | Residual potential | Charged potential | Residual potential |
| Example 1 | 1.0 | −705 | −10 | −620 | −34 |
| Example 2 | 0.9 | −700 | −14 | −615 | −23 |
| Example 3 | 1.1 | −685 | −10 | −600 | −30 |
| Example 4 | 0.8 | −715 | −8 | −604 | −20 |

TABLE 3-continued

| | Half decay exposure (lux · sec) | The first measurement (V) | | The 5000th measurement (V) | |
|---|---|---|---|---|---|
| | | Charged potential | Residual potential | Charged potential | Residual potential |
| Example 5 | 1.2 | −718 | −12 | −634 | −32 |
| Example 6 | 0.9 | −695 | −10 | −625 | −28 |
| Comparative Example 1 | 2.0 | −710 | −12 | −570 | −38 |
| Comparative Example 2 | 1.8 | −720 | −14 | −600 | −34 |
| Comparative Example 3 | 2.4 | −680 | −10 | −578 | −48 |

TABLE 4

| | Comparative azo pigment | $R_1$ | $R_2$ |
|---|---|---|---|
| Comparative Example 1 | B1 | H | 4-Cl |
| Comparative Example 2 | B2 | 4-$CH_3$ | 4-Cl |
| Comparative Example 3 | B3 | 4-$C_2H_5$ | 4-Cl |

TABLE 5

| | Azo pigment |
|---|---|
| Example 2 | P5 |
| Example 3 | P8 |
| Example 4 | P10 |
| Example 5 | P11 |
| Example 6 | P17 |

It can be seen from the above results that the photoreceptors of the present invention are superior to those of comparative examples in electrophotographic characteristics, especially in sensitivity. Furthermore, the photoreceptors of the present invention are equal to or superior to those of comparative examples in stability against repeated use. These characteristics of the present photoreceptors show that they can be used in medium-to high-speed output machines, for example, copying machines by which 40 copies/min or more can be made.

COMPARATIVE EXAMPLES 4–6

Comparative azo pigments are shown by the following formulas (A), (B) and (C). Double-layered type photoreceptors were produced in the same manner as in Example 1 except that azo pigments as shown in Table 6 were used. The half decay exposure and the repetition characteristics of the resulting photoreceptors were measured under the same conditions as in Example 1. The results are shown in Table 7.

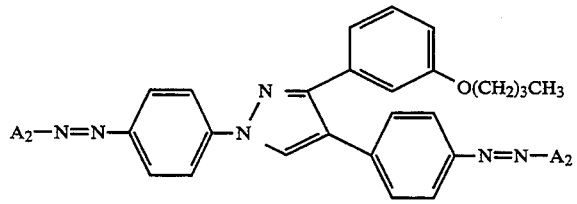

(A)

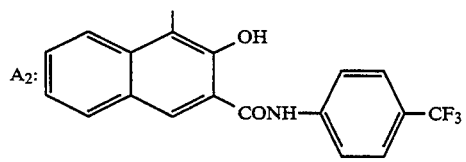

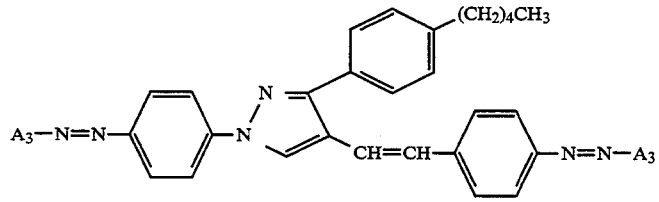

(B)

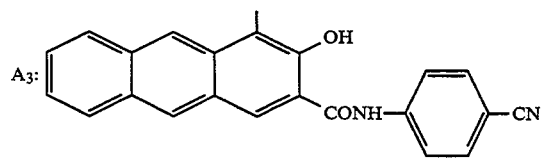

-continued

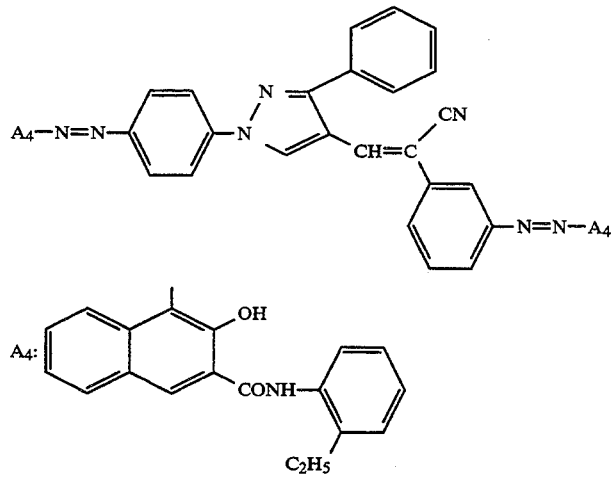

(C)

A$_4$:

TABLE 6

| | Comparative azo pigment |
|---|---|
| Comparative Example 4 | (A) |
| Comparative Example 5 | (B) |
| Comparative Example 6 | (C) |

TABLE 7

| | Half decay exposure (lux · sec) | The first measurement (V) | | The 5000th measurement (V) | |
|---|---|---|---|---|---|
| | | Charged potential | Residual potential | Charged potential | Residual potential |
| Comparative Example 4 | 2.4 | −700 | −10 | −580 | −34 |
| Comparative Example 5 | 3.5 | −700 | −28 | −315 | −63 |
| Comparative Example 6 | 1.8 | −678 | −5 | −186 | −18 |

It can be seen from the results of Table 7 that although the basic skeleton of the comparative azo pigments used in the electrophotographic photoreceptors in these comparative examples resembles the skeleton of the azo pigments used in the present invention, the photoreceptors of the comparative examples are inferior to the photoreceptors of the above examples according to the present invention in sensitivity and repetition characteristics.

EXAMPLE 7

One part by weight of azo pigment P15 as a carrier generation material and 1 part by weight of a polyvinyl-butyral resin (#3000-K manufactured by Denki Kagaku Kogyo Co.) were mixed with 50 parts by weight of tetrahydrofuran and were dispersed for 2 hours by a paint conditioner together with glass beads. The resulting pigment dispersion was dip coated on a metallic aluminum drum (diameter 80 mm, JIS #1050) and dried at 80° C. for 15 minutes to form a carrier generation layer having a thickness of about 0.2$\mu$.

Then, 10 parts by weight of a stilbene compound represented by the following formula and 10 parts by weight of a polycarbonate resin (Z-200 manufactured by Mitsubishi Gas Chemical Company, Inc.) were dissolved in 160 parts by weight of dichloroethane. The resulting solution was dip coated on the carrier generation layer formed hereabove and dried at 80° C. for 60 minutes to form a carrier transport layer having a dry thickness of 20$\mu$.

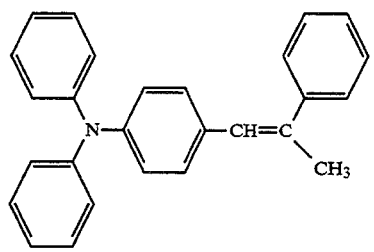

The thus obtained drum-like photoreceptor was mounted on a commercially available copying machine (which can produce 40 copies of A4 size per one minute) and 5000 copies were produced. As a result, clear images with no fog were stably obtained.

As is clear from the above explanation, the present invention provides an electrophotographic photoreceptor high in sensitivity and excellent in characteristics on repetition of electrophotographic process.

What is claimed is:

1. An electrophotographic photoreceptor which comprises an electrically conductive support and a light-sensitive layer which contains at least one azo pigment represented by the following formula (I):

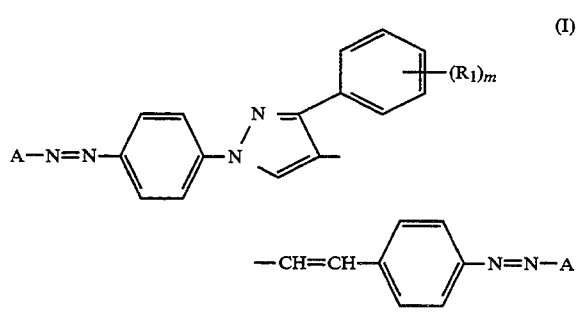

(I)

-continued

A: 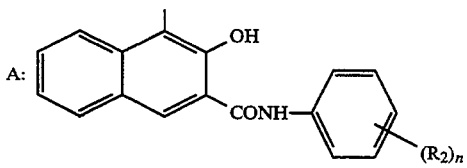

wherein $R_1$ represents an unsubstituted or substituted alkyl or alkoxy group having 3 to 8 carbon atoms, $R_2$ represents a hydrogen atom, a halogen atom or an unsubstituted or substituted alkyl or alkoxy group having 1 to 3 carbon atoms and m and n each represent 1 or 2.

2. An electrophotographic photoreceptor according to claim 1, wherein the light-sensitive layer comprises a binder in which the azo pigment of the formula (I) is dispersed.

3. An electrophotographic photoreceptor according to claim 1, wherein the light-sensitive layer comprises a carrier transport material in which the azo pigment of the formula (I) is dispersed.

4. An electrophotographic photoreceptor according to claim 1, wherein the light-sensitive layer comprises a carrier generation layer comprising the azo pigment of the formula (I) and a carrier transport layer containing a carrier transport material.

5. An electrophotographic photoreceptor according to claim 1, wherein the light-sensitive layer comprises a carrier generation layer comprising a binder in which the azo pigment of the formula (I) is dispersed and a carrier transport layer containing a carrier transport material.

6. An electrophotographic photoreceptor according to claim 1, wherein the light-sensitive layer comprises a carrier generation layer comprising a carrier transport material in which the azo pigment of the formula (I) is dispersed and a carrier transport layer containing a carrier transport material.

7. An electrophotographic photoreceptor according to claim 1, wherein the light-sensitive layer additionally contains an antioxidant and/or a sensitizer.

8. An electrophotographic photoreceptor according to claim 1, which has a blocking layer between the light-sensitive layer and the support.

9. An electrophotographic photoreceptor according to claim 1, which has a surface protective layer on the surface of the light-sensitive layer.

* * * * *